N. W. HOLT.

FLOUR BOLT.

No. 10,617. Reissued June 30, 1885.

Witnesses:

J. E. Turner

J. S. Barker

Inventor:

Noah W. Holt by Doubleday & Hoblin attys.

N. PETERS, Photo-Lithographer, Washington, D. C.

UNITED STATES PATENT OFFICE.

NOAH W. HOLT, OF BUFFALO, NEW YORK.

FLOUR-BOLT.

SPECIFICATION forming part of Reissued Letters Patent No. 10,617, dated June 30, 1885.

Original No. 299,790, dated June 3, 1884. Application for reissue filed March 31, 1885.

*To all whom it may concern:*

Be it known that I, NOAH W. HOLT, a citizen of the United States, residing at Buffalo, in the county of Erie and State of New York, have invented certain new and useful Improvements in Flour-Bolts; and I do hereby declare the following is a full, clear, and exact description thereof, that will enable others skilled in the art to which it appertains to make and use the same, reference being had to the accompanying drawings, and to letters of reference marked thereon, which form a part of this specification.

This invention relates to that class of flour-bolts in which is employed a revolving reel covered with bolting-cloth, in one end of which the material to be bolted is discharged, and usually accumulates in a comparatively thick mass or layer upon that portion of the cloth which lies almost immediately below the axis of the reel, except that as the reel rotates the material is carried part way up toward a line horizontal with the axis, and slides down over the upward-moving cloth, whereby it is sifted through the meshes. In this style of reel as heretofore made only a small portion of the cloth is utilized at any one time, that being the portion of upward-moving cloth below the axis.

The object of this invention is to increase the capacity of such reels by utilizing a portion of the downward-moving cloth upon the opposite side of the axis.

To this end one part of the invention relates to the combination, with a bolting-reel having an outer finely-reticulated surface adapted for the bolting of flour, of an interior drum rotating in the same direction with the reel, these parts being so constructed and operated that material which is elevated by the upward-moving bolting-cloth to a point above the horizontal plane of the axis shall be discharged upon the interior drum, and by it delivered upon the downward-moving bolt-cloth on the opposite side of the reel.

The invention further relates to certain details of construction, as will be hereinafter fully explained.

Figure 1:
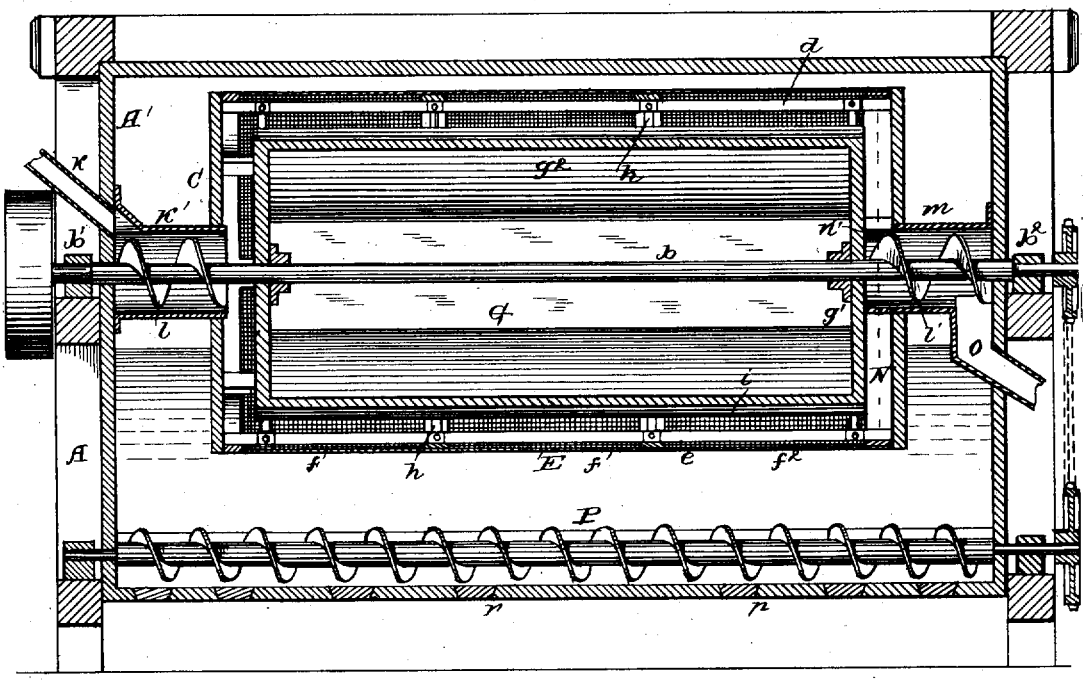
Figure 2:
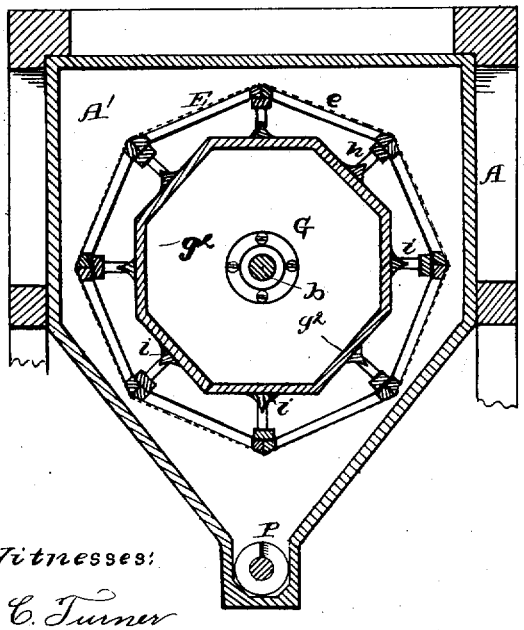
Figure 3:
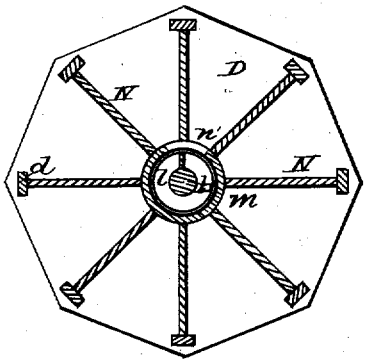

In the accompanying drawings, Figure 1 is a longitudinal section of a bolting-reel provided with my improvements. Fig. 2 is a cross section thereof. Fig. 3 is a cross section on line $x\ x$, Fig. 1.

Like letters of reference refer to like parts in the several figures.

A represents the stationary frame of the machine, and A′ the inclosing casing or chest secured thereto.

$b$ represents the reel-shaft, which is supported in bearings $b'\ b'$, secured to the frame A.

C represents the head of the reel, arranged at its feed end, and D the head arranged at the discharge end, the heads C and D being connected together by longitudinal ribs $d$. The heads C and D are preferably octagonal in shape, as shown, and as many longitudinal ribs as there are sides in the heads C and D are employed, thus forming an eight-sided reel, though a reel having a less number of sides may be employed, if desired.

E represents the bolting-cloth, which is secured to removable frames $e$, which fill the spaces between the longitudinal ribs and the heads of the reel. The frames $e$ are secured to the ribs $d$ by screws or otherwise, so that they can be readily removed from the reel when desired. A suitable number of such frames are arranged side by side in each space between two longitudinal ribs and the head and tail of the reel. As shown in Fig. 1 of the drawings, each side of the reel is composed of three sections, $f\ f'\ f^2$. These sections are covered with bolting-cloth having different degrees of fineness, the coarser cloth being preferably arranged on the section $f^2$ at the tail end of the reel. The size or number of mesh of the reel-covering can be regulated as required by the character of the material to be bolted by the removable sectional frames in an obvious manner.

G represents a closed drum arranged within the bolting-reel and secured to the shaft $b$ by tight heads $g\ g'$. As shown in Figs. 1 and 2, the drum is hollow, and its sides are practically imperforate, so that little or no material will pass into the interior of the drum. The periphery of the drum G has preferably as many sides as the reel, and its sides $g^2$ are arranged at an angle to or not parallel with the sides of the reel, as clearly shown in Fig. 2. This relative arrangement of the sides of the drum to the sides of the reel causes the material sliding from the sides of the drum to impinge against the bolting-cloth at a higher point than it would otherwise, and also assists in elevating the material on the ascending side of the reel.

*h* are braces or rods, which connect the drum G with the bolting-reel, and whereby the latter is caused to revolve with the drum. The rods *h* extend from the sides $g^2$ of the drum, and are secured to the longitudinal ribs *d* of the reel, and form braces for the latter.

*i* are longitudinal ribs or buckets projecting from the sides $g^2$ of the drum.

*k* represents the feed-spout whereby the material to be bolted is introduced into the machine, and *k'* is a cylinder or tube which surrounds the shaft *b*, and which receives the material from the feed-spout *k*. The tube *k'* is firmly secured to the inclosing-case A' of the machine at one end, and its opposite end extends into the reel through a central opening formed in the reel-head C.

*l* is a screw-conveyer secured to the shaft *b* within the tube *k'* in such manner as to propel the material from the tube into the bolting-reel.

*l'* is a similar conveyer secured to the shaft *b* at the tail end of the machine, and surrounded by a tube or cylinder, *m*, secured to the casing of the machine. The inner end of the tube *m* extends through a central opening formed in the head D of the reel, and abuts against the outer sides of the head *g'* of the drum G.

N are radial ribs secured to the inner side of the head D, between the latter and the outer side of the head *g'* of the drum, and extending from the tube *m* to the longitudinal ribs of the reel. The material which reaches the inner side of the head D is lifted by the ribs N and delivered through the opening *n'* into the tube *m*, from which it is discharged by means of the screw-conveyer *l'* into the spout *o*. The material which is fed through the conveyer *l* falls into the space between the head *g* of the drum and the reel-head C onto the bottom of the reel. As the reel rotates the material is gradually elevated on the ascending side of the reel until the inclination of that portion of the reel on which the material rests becomes so steep that the material descends over the inclined bolting-surface, whereby the fine material is separated from the coarse parts. As the material accumulates on the ascending side of the reel part of it is carried by the buckets *i* and the drum G to the opposite or descending side of the reel, where the material escapes from the buckets and descends over the inclined bolting-surface. In this manner a portion of the material is bolted on the descending side of the reel. As the space between the drum G and the bolting-reel is comparatively small, the material is retained near the bolting-surface at all times, thereby increasing the efficiency of the bolting-surface.

P is a screw-conveyer, arranged in the bottom of the chest or trough, which receives the bolted material, and which may be provided with a suitable number of openings controlled by slides *p*, through which different portions of the material may be drawn off at desire.

It is well known to many who are familiar with the operation of flour-bolts of some of the ordinary constructions that when they are run at a certain speed a quite large portion of the material is carried upward and in contact with the bolting-cloth on the ascending side of the reel to such distance that when the weight of the material causes it to leave the bolt-cloth it falls back upon the inner surface of the reel, sometimes even in front of its axis, and that when it strikes the cloth drives specks through the meshes to a very injurious extent. This action has hitherto prevented the rotating of reels of such construction as rapidly as would be desirable were it not for the operation last above described. The object of my invention is to enable me to run a reel at the desired rate of speed, and also to utilize a part of the downward-moving cloth for bolting purposes, whereby the capacity of the reel is largely increased. I believe I am the first to invent a reel in which these desired results can be secured.

I am aware of the patent No. 73,167, W. Craig, for flour-bolt, and I do not claim any invention therein shown; but said Craig patent explains that when in operation his reel carries the flour and bran along smoothly without raising the same and letting it fall upon the inner surface of the bolt-cloth, as had been customary in bolts of the ordinary construction. His patent explains that such result is attained in his bolt, not by the use of the partition-cloth $v^2$, but by means of the peculiar construction of his cloth-supporting ribs *m'*, which are placed upon the outside of his bolt-cloth, and do not project inward beyond the cloth, there being no intimation that his reel is so operated as to elevate a portion of the material being bolted, then drop it upon the partition cloth $v^2$, and have it slide therefrom upon the bolting-cloth on the descending side of the reel, as is done in my bolt. Nor would it be practicable to rotate the Craig reel at such speed that any portion of the material being bolted would be carried up by centrifugal action and dropped upon the partition-cloth $v^2$, from the fact that if this were done the material which had been sifted through the inner bolting-cloth *v* upon the partition-cloth $v^2$ would be carried up and dropped back upon the inner bolting-cloth, from the fact that such flour would, when traversing the upper sections of such inner bolting-cloth, be sifted through it into the interior of the reel from whence it had recently passed, thus seriously retarding the operation of the reel.

What I claim is—

1. The combination, in a flour-bolt, with a reel having an outer finely-reticulated bolting-surface, and adapted to elevate material above its axis, of an interior drum rotating in the same direction with the reel, and adapted to receive material elevated by the outer bolting-surface and deliver it to the downward-moving portion of the bolting-surface, substantially as set forth.

2. The combination, in a flour bolt, of a reel having an outer finely-reticulated bolting-surface, and adapted to elevate material above its axis, and a many-sided interior drum rotating in the same direction with the reel, having a substantially imperforate surface, and adapted to receive material elevated by the outer bolting-surface and deliver it to the downward-moving portion of the bolting-surface, substantially as set forth.

3. The combination, with a bolting-reel, of a drum, G, secured within the reel, to revolve at the same speed and in the same direction with the reel, and having its sides $g^2$ arranged at an angle to the sides of the reel, substantially as set forth.

4. The combination, with a bolting-reel, of a drum, G, having tight heads $g$ $g'$, and secured within the reel to rotate in the same direction and with the same speed as the reel, and longitudinal ribs or buckets $i$, secured to said drum and projecting toward the inner surface of the reel, whereby some of the material is elevated and carried from the ascending side to the descending side of the reel, substantially as set forth.

5. The combination, with the shaft $b$, of the reel-heads C D, longitudinal ribs $d$, secured to said heads, drum G, provided with tight heads $g$ $g'$ and secured to the shaft, and braces $h$, connecting the ribs $d$ with said drum, substantially as set forth.

6. In a flour-bolt, the combination of an outer bolting-reel having a finely-reticulated surface and provided at the receiving end with a closed head having a feed-opening, a central shaft, an inner rotating drum adapted to receive material elevated by one side of the reel and deliver it to the opposite side of the reel, and ribs supported by the drum and projecting beyond the head of the drum and connected with one end of the bolting-reel, substantially as set forth.

7. In a flour-bolt, the combination of an outer reel having a finely-reticulated surface and provided at one end with a closed head having a feed-opening, a central shaft, and an inner rotating drum, shorter than the bolting-reel and adapted to receive material elevated by one side of the reel and deliver it to the opposite side of the reel, and provided at one end with a closed head arranged at a short distance from the receiving end of the bolting-reel, whereby there is formed a vertical passage through which material can fall from the feed-opening upon the bolt-cloth, substantially as set forth.

8. In a flour-bolt, the combination, with an outer bolting-reel having a finely-reticulated surface, of a central shaft, an inner rotating drum, which is shorter than the bolting-reel, and is adapted to receive material elevated by one side of the reel and deliver it to the opposite side of the reel, and ribs attached to the drum and projecting horizontally therefrom and connected at their ends to the bolting-reel, substantially as set forth.

9. In a flour-bolt, the combination of an outer bolting-reel having a finely-reticulated surface, a central shaft, an inner rotating drum, adapted to receive material elevated by one side of the reel and deliver it to the opposite side of the reel, and braces projecting from the outer surface of the drum and adapted to support the bolt-cloth between the ends of the bolting-surface, substantially as set forth.

10. The combination of an outer bolting-reel having a finely-reticulated surface, a central shaft, an inner rotating drum adapted to receive material elevated by one side of the reel and deliver it to the opposite side of the reel, the drum having a closed head arranged at a short distance from the discharging end of the reel, and means adapted to lift unbolted material and discharge it between the closed head at the tail end of the drum and the adjacent reel-head at the tail end of the reel, substantially as set forth.

In testimony whereof I affix my signature in presence of two witnesses.

NOAH W. HOLT.

Witnesses:
GEO. S. BENNETT,
GEO. F. SHERWOOD.